United States Patent
Yang et al.

(10) Patent No.: US 8,125,740 B1
(45) Date of Patent: Feb. 28, 2012

(54) DISK DRIVE ACTUATOR HAVING A BOBBIN CONTACTING A CLOSED COIL PERIPHERY AT TWO LOCATIONS

(75) Inventors: Jian Yang, Fremont, CA (US); Jifang Tian, Fremont, CA (US); Qiang Yang, Fremont, CA (US); Hongqi Li, Redwood City, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 108 days.

(21) Appl. No.: 12/778,033

(22) Filed: May 11, 2010

(51) Int. Cl.
*G11B 21/02* (2006.01)
(52) U.S. Cl. .................................................. 360/265.8
(58) Field of Classification Search ................ 360/265.8
See application file for complete search history.

(56) References Cited

U.S. PATENT DOCUMENTS

| | | | |
|---|---|---|---|
| 4,879,617 A | 11/1989 | Sampietro et al. | |
| 4,969,058 A | 11/1990 | Williams et al. | |
| 5,168,185 A | 12/1992 | Umehara et al. | |
| 5,305,169 A | 4/1994 | Anderson et al. | |
| 5,404,258 A | 4/1995 | Arin et al. | |
| 5,483,399 A | 1/1996 | Jeong et al. | |
| 5,568,333 A | 10/1996 | Bang | |
| 5,585,981 A | 12/1996 | Lee | |
| 5,621,591 A * | 4/1997 | Rahimi et al. | 360/265 |
| 5,790,348 A | 8/1998 | Alfred et al. | |
| 5,862,019 A | 1/1999 | Larson | |
| 6,061,206 A | 5/2000 | Foisy et al. | |
| 6,078,477 A | 6/2000 | Adams et al. | |
| 6,144,530 A | 11/2000 | Shiraishi et al. | |
| 6,181,530 B1 | 1/2001 | Ratliff et al. | |
| 6,252,746 B1 * | 6/2001 | Cho | 360/265.8 |
| 6,302,626 B1 | 10/2001 | Du et al. | |
| 6,307,717 B1 | 10/2001 | Jeong | |
| 6,404,596 B1 | 6/2002 | McReynolds et al. | |
| 6,480,364 B1 | 11/2002 | Thanomsat et al. | |
| 6,512,658 B1 | 1/2003 | Jierapipatanakul et al. | |
| 6,787,941 B2 | 9/2004 | Takashima | |
| 6,801,404 B1 * | 10/2004 | Oveyssi | 360/265.8 |
| 6,847,506 B1 | 1/2005 | Lin et al. | |
| 6,867,950 B1 * | 3/2005 | Lin | 360/265.8 |

(Continued)

FOREIGN PATENT DOCUMENTS

JP 02114846 A 4/1990

(Continued)

OTHER PUBLICATIONS

U.S. Appl. No. 12/163,815, filed Jun. 27, 2008, 17 pages.

*Primary Examiner* — Mark Blouin

(57) ABSTRACT

A disk drive has an actuator coil that includes first and second lateral legs joined by first and second longitudinal legs to form a closed coil periphery. The first lateral leg is disposed closer to the actuator pivot bore than the second lateral leg. The first and second longitudinal legs join the second lateral leg at a first interior bend location and at a second interior bend location within the closed coil periphery, respectively. A bobbin is disposed within the closed coil periphery and contacts the conductive coil at two locations (e.g. the first interior bend location and the second interior bend location). Preferably, the bobbin defines a total bobbin length and an average bobbin width, and the total bobbin length is at least 3 times the average bobbin width.

21 Claims, 3 Drawing Sheets

U.S. PATENT DOCUMENTS

| | | |
|---|---|---|
| 6,879,466 B1 * | 4/2005 | Oveyssi et al. ............ 360/265.7 |
| 6,940,698 B2 | 9/2005 | Lin et al. |
| 6,947,260 B2 | 9/2005 | Dominguez et al. |
| 6,970,330 B2 | 11/2005 | Arisaka et al. |
| 6,980,401 B1 * | 12/2005 | Narayanan et al. ........ 360/265.8 |
| 7,675,714 B1 | 3/2010 | Yucesan et al. |
| 7,876,533 B2 * | 1/2011 | Shin et al. .................. 360/265.8 |
| 2002/0167763 A1 * | 11/2002 | Macpherson et al. ..... 360/265.8 |
| 2003/0081355 A1 | 5/2003 | Arisaka et al. |
| 2004/0095682 A1 | 5/2004 | Dominguez et al. |
| 2004/0169961 A1 | 9/2004 | Lin et al. |
| 2007/0086118 A1 | 4/2007 | Matsumura et al. |
| 2009/0059435 A1 | 3/2009 | Huang et al. |

FOREIGN PATENT DOCUMENTS

| | | |
|---|---|---|
| JP | 05184123 A | 7/1993 |
| JP | 2000020979 A | 1/2000 |

* cited by examiner

DISK DRIVE ACTUATOR HAVING A BOBBIN CONTACTING A CLOSED COIL PERIPHERY AT TWO LOCATIONS

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), a spindle motor for rotating the disk, and a head stack assembly (HSA). The printed circuit board assembly includes electronics and firmware for controlling the rotation of the spindle and for controlling the position of the HSA, and for providing a data transfer channel between the disk drive and its host.

The HSA typically includes an actuator, at least one head gimbal assembly (HGA), and a flex cable assembly. Each HGA includes a head for reading and writing data from and to the disk. In magnetic recording applications, the head typically includes an air bearing slider and a magnetic transducer that comprises a writer and a read element. In optical and magneto-optical recording applications, the head may include a mirror and an objective lens for focusing laser light on to an adjacent disk surface. The head is typically adhered to a suspension assembly that acts to preload the head against the surface of the disk.

During operation of the disk drive, the actuator must rotate to position the HGAs adjacent desired information tracks on the disk. The actuator typically includes a pivot-bearing cartridge to facilitate such rotational positioning. One or more actuator arms typically extends from the actuator body. An actuator coil is typically attached to the actuator opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator.

There is competitive pressure to continually develop hard disk drives that can access data more quickly, and so techniques are continuously being developed to decrease access time. One potential technique to accomplish this is to increase the rotational accelerations with which the head stack assembly is pivoted to position the head over a desired track of information on the disk. Unfortunately, higher rotational accelerations and applied torques on the actuator may lead to increased excitation of certain undesired vibration modes of the actuator. Externally applied mechanical shocks can also excite such actuator vibration modes.

In particular, if there is inadequate frequency separation between an actuator system mode (e.g. the so-called butterfly modes and/or S-mode of the actuator system), with respect to an actuator arm mode (e.g. the actuator arm sway modes and/or torsion modes), then the useful bandwidth of effective actuator control may be undesirably reduced. Thus, there is a need in the art for ways to ensure adequate frequency separation between two or more of the aforementioned vibration modes of a disk drive actuator.

DETAILED DESCRIPTION

Figure 1:
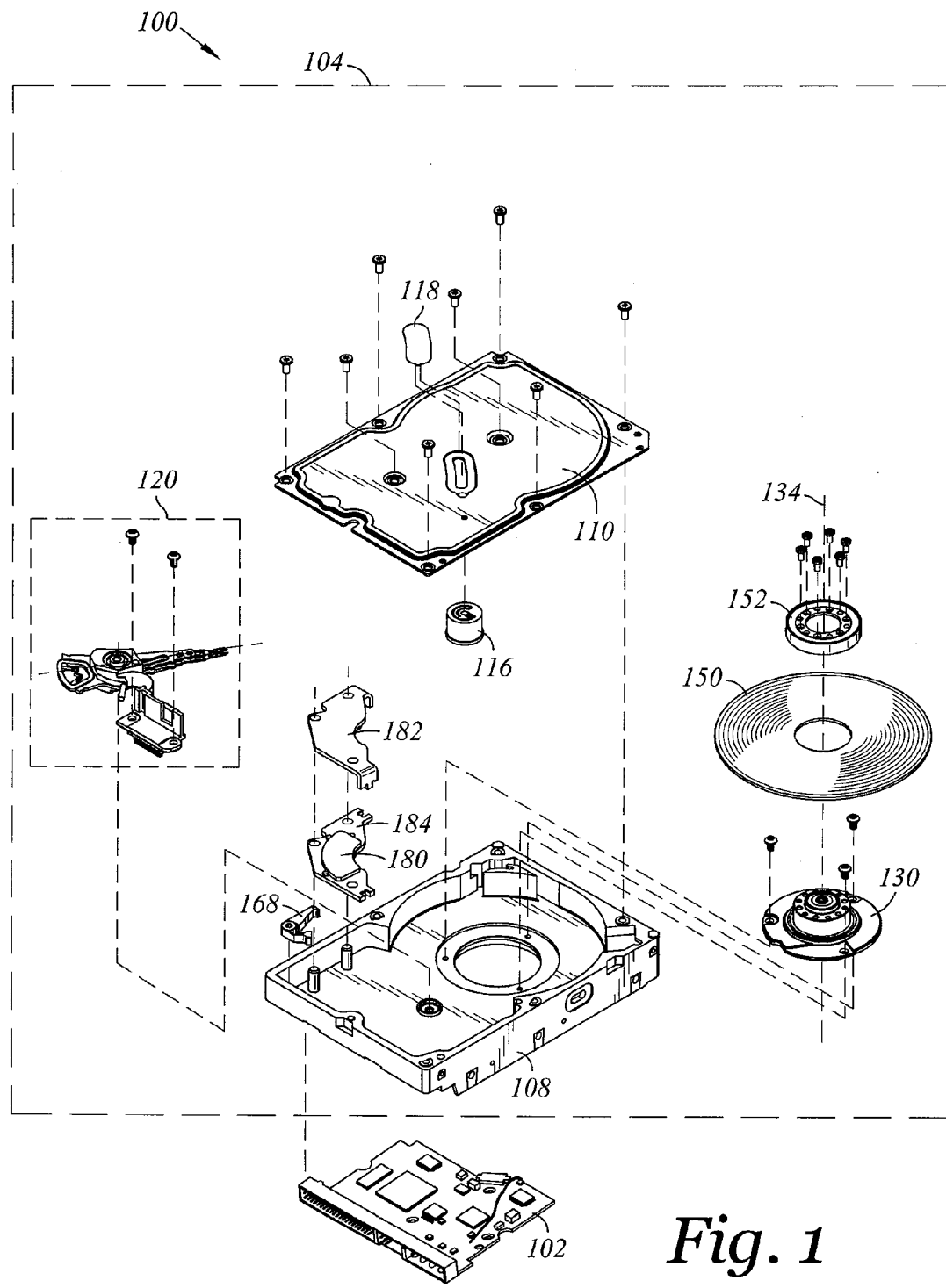
FIG. 1 depicts an exploded perspective view of a disk drive according to an embodiment of the present invention.

FIG. 1 is an exploded perspective view of a disk drive 100 according to an embodiment of the present invention. The disk drive 100 includes a head disk assembly (HDA) 104 and a printed circuit board assembly (PCBA) 102. The PCBA 102 includes conventional circuitry for processing signals and controlling the operations of the disk drive 100. The HDA 104 includes a base 108 and a cover 110 attached to the base 108 to collectively house at least one disk 150, a spindle 130 attached to the base 108 for rotating disk 150, and a head stack assembly (HSA) 120 rotatably attached to the base 108. The cover 110 may include an opening for a breather filter 116 and a covering 118 for a larger opening for use in servo writing the disk 150. The base 108 may be attached to the cover 110 by means of screws or another conventional fastening method. The disk 150 may be mounted to the spindle 130 by a conventional disk clamp 152. The spindle 130 may rotate the disk 150 at a constant angular velocity about a spindle rotation axis 134.

Figure 2:
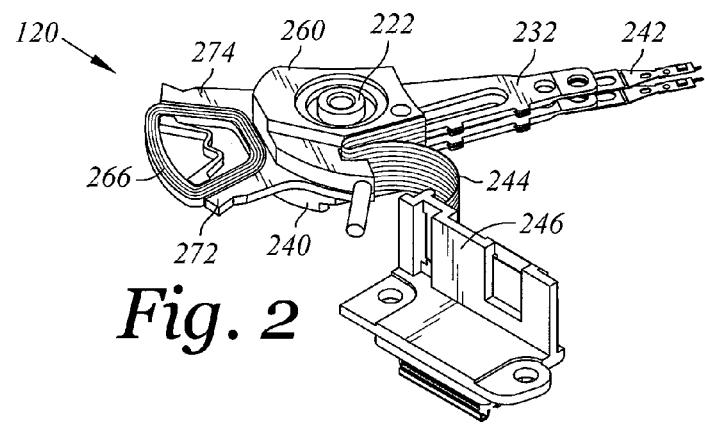
FIG. 2 a head stack assembly according to an embodiment of the present invention.
Figure 3A:
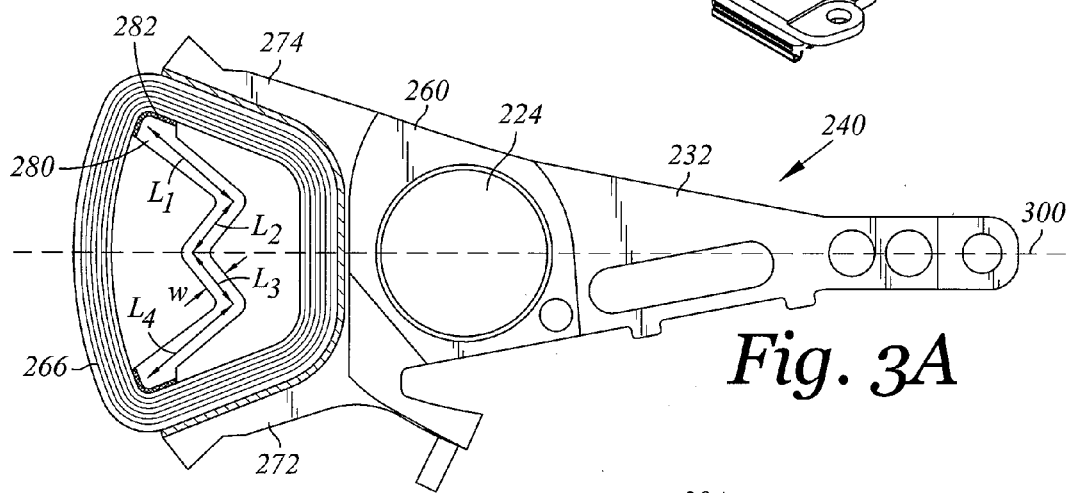
FIG. 3A depicts an actuator according to an embodiment of the present invention.

FIG. 2 depicts the HSA 120 according to an embodiment of the present invention, and FIG. 3A depicts an actuator 240 according to an embodiment of the present invention. Now referring additionally to FIGS. 2 & 3A, the HSA 120 comprises the swing-type or rotary actuator 240, at least one head gimbal assembly (HGA) 242, a flex cable 244, and a flex cable bracket 246 fixed to the base 108. The HGA 242 supports a head (not visible in this view) for writing and reading data to and from the disk 150. In magnetic recording hard disk drive applications, the head may include a magneto resistive sensor for reading data from disk 150, and a longitudinal or perpendicular type inductive transducer for writing data to disk 150. In optical or magneto-optical recording applications, the head may include an objective lens for focusing laser light upon the recording media surface. The storage capacity of the disk drive 100 may be increased by the use of additional disks and by the HSA 120 having correspondingly more HGAs supported by multiple actuator arms.

The rotary actuator 240 includes an actuator body 260 having a pivot bore 224 for receipt of pivot-bearing cartridge 222. In certain embodiments, the actuator body 260 may be fabricated of a metal material such as aluminum, stainless steel, magnesium, beryllium, or an alloy thereof, by casting and/or forging. At least one actuator arm 232 is cantilevered from the actuator body 260, and defines an arm longitudinal axis 300. A coil 266 is cantilevered from the actuator body 260 in a direction that is generally (but not necessarily exactly) opposite from the actuator arm 232. The coil 266 is attached to the actuator body 260 and supported by coil fork prongs 272, 274, for example by being bonded to the actuator body 260 and the coil fork prongs 272, 274 by an adhesive.

The HSA 120 is rotably attached to the base 108 via a pivot-bearing cartridge 222 mounted through the pivot bore 224 of the actuator body 260 of the HSA 120, so that the pivot axis of the HSA is substantially parallel to the spindle rotation axis 134. A voice coil motor (VCM) may include top and bottom VCM plates 182, 184 mounted to the base 108. One or both of the VCM plates may include a permanent magnet (e.g. permanent magnet 180). The VCM plates 182, 184 form a yoke to carry magnetic flux from the permanent magnet(s). The coil 266 of the actuator assembly 240 may be disposed between the top and bottom VCM plates 182 and 184 to cause rotation of the HSA 120 about the pivot axis defined by the pivot bearing cartridge 222 in response to an electrical current passed through the coil 266. In this way, the VCM controllably positions the head(s) of the HSA 120 relative to the disk 150 for writing and/or reading data. The angular range of HSA pivoting may be limited by one or more stops, and the HSA may be held adjacent a stop by a latch (e.g. actuator latch 168).

Figure 3B:
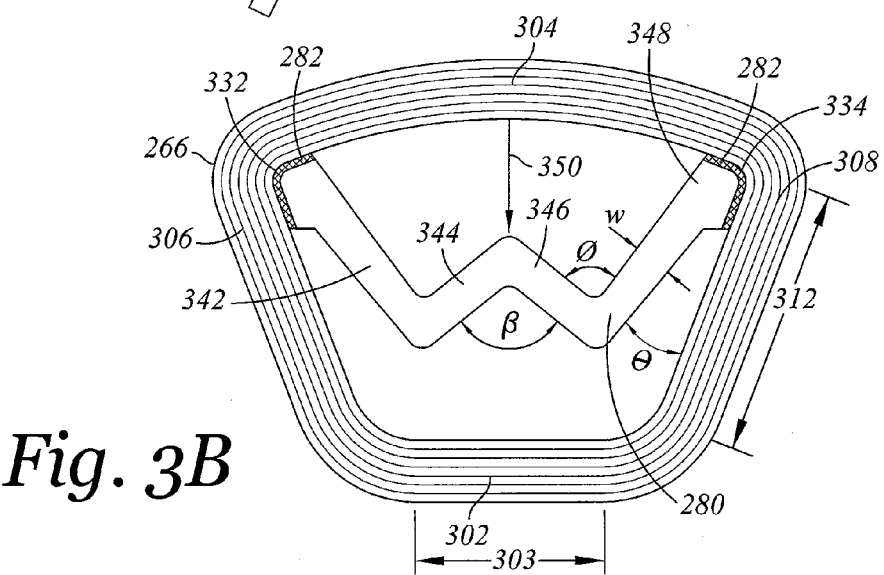
FIG. 3B depicts an actuator coil assembled with a coil bobbin according to an embodiment of the present invention.

FIG. 3B further depicts the actuator coil 266 assembled with a slender bobbin 280 according to an embodiment of the present invention. Now referring additionally to FIG. 3B, the bobbin 280 may be bonded within the coil 266, for example by adhesive layer 282. The bobbin 280 in the embodiment of FIG. 3A may be considered slender because its total length (i.e. L1+L2+L3+L4) is preferably at least 3 times its average width w, in certain embodiments. The slender bobbin 280 may, in certain embodiments, advantageously allow the use of a metal bobbin material. A metal material may be practical in the embodiment of FIGS. 2 and 3A because eddy currents may be reduced by the slender geometry, whereas non-slender bobbin geometries may require a non-metal material to reduce eddy currents.

Non-metal bobbin materials are contemplated herein, but they have more difficulty conducting heat away from the coil 266, and may have a larger difference in coefficient of thermal expansion relative to the material of the actuator body 260 that can stress adhesive bonds. Also, the bobbin 280 may be fabricated from a single layer of material (e.g. metal), however it may also be fabricated from more than one layer. An air gap may exist between the layers of the bobbin 280, so that the bobbin 280 may function more efficiently (e.g. as fins) to convect heat away from the conductive coil 266.

In the embodiment of FIG. 3B, the conductive coil 266 includes a first lateral leg 302 and a second lateral leg 304, joined by a first longitudinal leg 308 and a second longitudinal leg 306, to form a closed coil periphery. The first longitudinal leg 308 defines a longitudinal leg length 312 measured generally parallel to the arm longitudinal axis 300, but not necessarily precisely parallel to the arm longitudinal axis 300. For example, the coil may be a so-called dog-leg coil that is skewed 5 degrees or so relative to the arm longitudinal axis. Also for example, the first longitudinal leg 308 and the second longitudinal leg 306 may have radial orientations that are mostly along the longitudinal axis, but not precisely so since each may be radial with respect to the center of the pivot bore 224. In such an example, the first and second longitudinal legs 308, 306, though approximately and generally parallel to the longitudinal axis, would be (more precisely) diverging as radiuses originating and intersecting at the actuator pivot bore 224. In any case, the first and second longitudinal legs 308, 306, are far closer to being parallel to the longitudinal axis than to being orthogonal to it.

The first lateral leg 302 and the second lateral leg 304 may each be disposed in an orientation that is generally transverse to the arm longitudinal axis 300. It is not necessary that the first lateral leg 302 and the second lateral leg 304 be precisely orthogonal to the arm longitudinal axis 300 to be considered "generally transverse" to the arm longitudinal axis 300. Rather, the first lateral leg 302 and the second lateral leg 304 may be considered as "generally transverse" to the arm longitudinal axis 300 if they are much closer to being orthogonal to the longitudinal axis 300 than to being parallel to it. For example, although the second lateral leg 304 is shown in FIGS. 3A and 3B to be curved, it is everywhere disposed in an orientation that is "generally transverse" to the arm longitudinal axis 300. Note also that the first lateral leg 302 is disposed closer to the actuator pivot bore 224 than is the second lateral leg 304. The first lateral leg 302 defines a first lateral leg length 303 measured generally transverse to the arm longitudinal axis 300. The first and second longitudinal legs 308, 306 join the second lateral leg 304 at a first interior bend location 334 and at a second interior bend location 332 within the closed coil periphery, respectively In the embodiment of FIG. 3B, the bobbin 280 is disposed within the closed periphery of conductive coil 266 and is attached to the conductive coil 266 by adhesive 282. The bobbin is considered to be "contacting" the conductive coil 266 where it is adhered by adhesive 282, in the sense that the adhesive 282 is considered to be part of the bobbin 280 and the adhesive is contacting the conductive coil 266. In this regard, in the embodiment of FIG. 3B the bobbin contacts the conductive coil 266 at only the first interior bend location 334 and the second interior bend location 332. In this regard, the first interior bend location 334 that is contacted by the bobbin 280 spans an extent along the first longitudinal leg 308 that is preferably in the range ¹⁄₁₀th to ⅓rd the longitudinal leg length 312. Such a limitation in the extent of contact between the bobbin and the conductive coil may, in certain embodiments, help ensure adequate bobbin compliance and dynamic characteristics, and/or acceptable frequency separation between the actuator system butterfly modes or S-mode with respect to the actuator arm sway or torsion modes.

The W shape may have more design parameters to independently control mass versus stiffness, than would a simpler curved shape. For example, in the embodiment of FIG. 3B, the W-shaped bobbin 280 includes a center peak portion 344, 346 between first and second outer wing portions 348, 342. Each of the first and second outer wing portions 348, 342 defines an outer wing length (e.g. $L_1$, $L_4$) that is preferably in the range ⅓rd to ¾th the longitudinal leg length 312. Also, each of the first and second outer wing portions 348, 342 defines an outer wing width w that is preferably in the range ¹⁄₁₀th to ⅓rd the longitudinal leg length 312. In certain embodiments, a minimum distance 350 between the center peak portion 344, 346 and the second lateral leg 304 is preferably in the range ¹⁄₂₀th to ⅓rd the longitudinal leg length 312. The foregoing dimensional restrictions may, in certain embodiments, help ensure adequate bobbin compliance and mass characteristics, and/or acceptable frequency separation between the actuator system butterfly modes or S-mode with respect to the actuator arm sway or torsion modes.

Furthermore, in the embodiment of FIG. 3B, the center peak portion 346 forms an angle φ with the first outer wing portion 348 that is preferably in the range 60° to 120°. The first outer wing portion 348 forms an angle θ with the first longitudinal leg 308 that is preferably in the range 20° to 60°. The center peak portion 344, 346 forms an interior peak angle β that is preferably in the range 60° to 150°. The foregoing angular restrictions may, in certain embodiments, help ensure adequate bobbin compliance and mass characteristics, and/or acceptable frequency separation between the actuator system butterfly modes or S-mode with respect to the actuator arm sway or torsion modes.

In the embodiment of FIG. 3B, the lengths, widths, and angles associated with the first outer wing portion 348 may optionally be equal to those associated with the second outer wing portion 342. Such an equality may be beneficial from a manufacturing viewpoint if it allows the W-shaped bobbin 280 to be installed with either of its two opposing major faces upward, however an inequality in one or more of these dimensions may be deliberately chosen to counteract some other imbalance in the actuator or coil.

Figure 4:
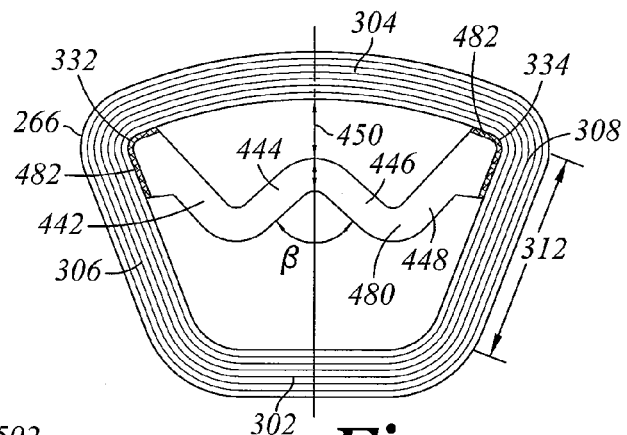
FIG. 4 depicts an actuator coil assembled with a coil bobbin according to another embodiment of the present invention.

FIG. 4 depicts an actuator coil 266 assembled with a coil bobbin 480 according to another embodiment of the present invention. The actuator coil 266 is like the actuator coil 266 described with reference to FIGS. 3A and 3B, and so the same numerical labels for its various features are used in FIG. 4 without repeating their description here. The coil bobbin 480 includes an adhesive 482 that contacts the actuator coil 266 in two locations (e.g. the first interior bend location 334 and the second interior bend location 332). The coil bobbin 480 is W-shaped, with similar dimensions to the W-shaped coil bobbin 280 of FIGS. 3A and 3B, except with gentler curves and fillets. In this regard, the coil bobbin 480 of FIG. 4 has similar design parameters to independently control mass versus stiffness.

For example, in the embodiment of FIG. 4, the W-shaped bobbin 480 includes a center peak portion 444, 446 between first and second outer wing portions 448, 442. A minimum distance 450 between the center peak portion 444, 446 and the second lateral leg 304 is preferably in the range ½0th to ⅓rd the longitudinal leg length 312. The center peak portion 444, 446 forms an interior peak angle β that is preferably in the range 60° to 150°. Such dimensional and angular restrictions may help ensure adequate bobbin compliance and mass characteristics, and/or acceptable frequency separation between the actuator system butterfly modes or S-mode with respect to the actuator arm sway or torsion modes.

Figure 5:
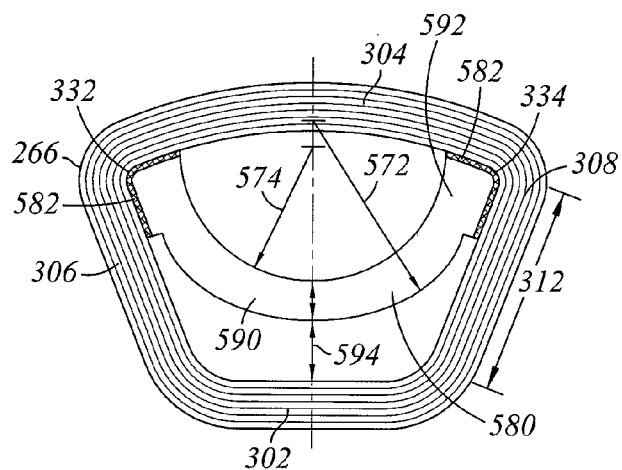
FIG. 5 depicts an actuator coil assembled with a coil bobbin according to another embodiment of the present invention.

FIG. 5 depicts an actuator coil 266 assembled with a coil bobbin 580 according to another embodiment of the present invention. The actuator coil 266 is like the actuator coil 266 described with reference to FIGS. 3A and 3B, and so the same numerical labels for its various features are used in FIG. 5 without repeating their description here. The coil bobbin 580 includes an adhesive 582 that contacts the actuator coil 266 in two locations (e.g. the first interior bend location 334 and the second interior bend location 332, or elsewhere on the longitudinal coil legs 306, 308).

In the embodiment of FIG. 5, the coil bobbin 580 is C-shaped and includes a convex periphery 590 facing the first lateral leg 302 and has a concave periphery 592 facing the second lateral leg 304. The convex periphery 590 defines a radius of curvature 572 that is preferably in the range ½ to ⅔ the longitudinal leg length 312. The concave periphery 592 defines a radius of curvature 574 that is preferably in the range ½ to ⅞th the longitudinal leg length 312. Also, a minimum distance 594 between the convex periphery 590 and the first lateral leg 302 is preferably in the range ½0th to ½ the longitudinal leg length 312. Such dimensional restrictions may help ensure adequate bobbin compliance and mass characteristics, and/or acceptable frequency separation between the actuator system butterfly modes or S-mode with respect to the actuator arm sway or torsion modes.

Figure 6:
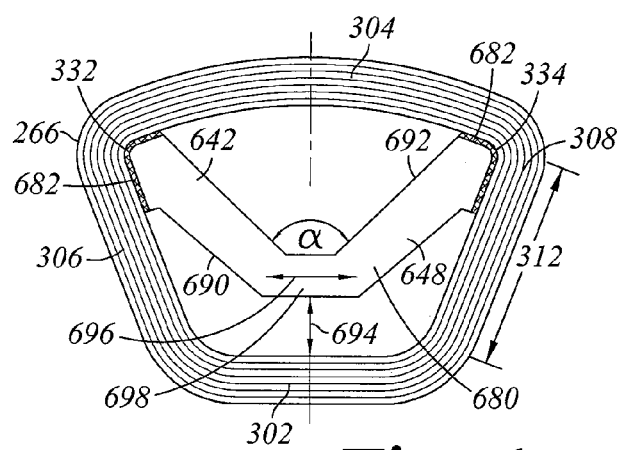
FIG. 6 depicts an actuator coil assembled with a coil bobbin according to another embodiment of the present invention.

FIG. 6 depicts an actuator coil 266 assembled with a coil bobbin 680 according to another embodiment of the present invention. The actuator coil 266 is like the actuator coil 266 described with reference to FIGS. 3A and 3B, and so the same numerical labels for its various features are used in FIG. 6 without repeating their description here. The coil bobbin 680 includes an adhesive 682 that contacts the actuator coil 266 in two locations (e.g. the first interior bend location 334 and the second interior bend location 332, or elsewhere on the longitudinal coil legs 306, 308).

In the embodiment of FIG. 6, the coil bobbin 680 is V-shaped and includes a convex periphery 690 facing the first lateral leg 302 and has a concave periphery 692 facing the second lateral leg 304. A minimum distance 694 between the convex periphery 690 and the first lateral leg 302 is preferably in the range ½0th to ½ the longitudinal leg length 312. The V-shaped bobbin 680 also includes a V apex 698 between first and second outer wing portions 648, 642. The V apex preferably has an apex length 696 in the range ½0th to ⅓rd the longitudinal leg length 312. The first and second outer wing portions 648, 642 define an angle α there between that is preferably in the range 60° to 150°. Such dimensional and angular restrictions may help ensure adequate bobbin compliance and mass characteristics, and/or acceptable frequency separation between the actuator system butterfly modes or S-mode with respect to the actuator arm sway or torsion modes.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. For example, the term "preferably" is consistently used herein to mean "preferably but not necessarily." The terms "comprising," "including," and "having," as used herein are intended to be read as open-ended terms.

We claim:

1. A disk drive comprising:
   a disk drive base;
   a spindle rotably coupled to the disk drive base, and a disk attached to the spindle; and
   an actuator, the actuator including
      an actuator body having an actuator pivot bore and an actuator arm extending away from the actuator pivot bore along an arm longitudinal axis;
      a conductive coil attached to the actuator body, the conductive coil including first and second lateral legs joined by first and second longitudinal legs to form a closed coil periphery, the first longitudinal leg defining a longitudinal leg length measured generally parallel to the arm longitudinal axis, the first and second lateral legs each being disposed in an orientation that is generally transverse to the arm longitudinal axis, the first lateral leg being disposed closer to the actuator pivot bore than the second lateral leg, wherein the first and second longitudinal legs join the second lateral leg at a first interior bend location and at a second interior bend location within the closed coil periphery, respectively; and
      a bobbin disposed within the closed coil periphery and contacting the conductive coil at only the first interior bend location and the second interior bend location, the bobbin defining a total bobbin length and an average bobbin width, and wherein the total bobbin length is at least 3 times the average bobbin width.

2. The disk drive of claim 1 wherein the bobbin has a curved shape.

3. The disk drive of claim 2 wherein the bobbin is a W-shaped bobbin.

4. The disk drive of claim 3 wherein the W-shaped bobbin includes a center peak portion between first and second outer wing portions, and wherein each of the first and second outer wing portions defines an outer wing length in the range $\frac{1}{3}^{th}$ to $\frac{3}{4}^{th}$ the longitudinal leg length.

5. The disk drive of claim 4 wherein each of the first and second outer wing portions defines an outer wing width in the range $\frac{1}{10}^{th}$ to $\frac{1}{3}^{rd}$ the longitudinal leg length.

6. The disk drive of claim 4 wherein a minimum distance between the center peak portion and the second lateral leg is in the range $\frac{1}{20}^{th}$ to $\frac{1}{3}^{rd}$ the longitudinal leg length.

7. The disk drive of claim 4 wherein the center peak portion forms an angle with the first outer wing portion in the range 60° to 120°.

8. The disk drive of claim 4 wherein the first outer wing portion forms an angle with the first longitudinal leg in the range 20° to 60°.

9. The disk drive of claim 4 wherein the center peak portion forms an interior peak angle in the range 60° to 150°.

10. The disk drive of claim 1 wherein the first interior bend location spans an extent along the first longitudinal leg that is in the range $\frac{1}{10}^{th}$ to $\frac{1}{3}^{rd}$ the longitudinal leg length.

11. The disk drive of claim 1 wherein the bobbin comprises a metal material.

12. The disk drive of claim 2 wherein the bobbin is a C-shaped bobbin having a convex periphery facing the first lateral leg and having a concave periphery facing the second lateral leg.

13. The disk drive of claim 12 wherein a minimum distance between the convex periphery and the first lateral leg is in the range $\frac{1}{20}^{th}$ to $\frac{1}{2}$ the longitudinal leg length.

14. The disk drive of claim 12 wherein the convex periphery defines a radius of curvature in the range $\frac{1}{2}$ to $\frac{3}{2}$ the longitudinal leg length.

15. The disk drive of claim 12 wherein the concave periphery defines a radius of curvature in the range $\frac{1}{2}$ to $\frac{7}{8}^{th}$ the longitudinal leg length.

16. The disk drive of claim 2 wherein the bobbin is a V-shaped bobbin having a convex periphery facing the first lateral leg and having a concave periphery facing the second lateral leg.

17. The disk drive of claim 16 wherein the V-shaped bobbin includes a V apex between first and second outer wing portions, wherein the V apex has an apex length in the range $\frac{1}{10}^{th}$ to $\frac{1}{3}^{rd}$ the longitudinal leg length, and wherein the first and second outer wing portions define an angle there between in the range 60° to 150°.

18. The disk drive of claim 16 wherein a minimum distance between the convex periphery and the first lateral leg is in the range $\frac{1}{20}^{th}$ to $\frac{1}{2}$ the longitudinal leg length.

19. An actuator for a disk drive, the actuator comprising:
an actuator body having an actuator pivot bore and an actuator arm extending away from the actuator pivot bore along an arm longitudinal axis;
a conductive coil attached to the actuator body, the conductive coil including first and second lateral legs joined by first and second longitudinal legs to form a closed coil periphery, the first longitudinal leg defining a longitudinal leg length measured generally parallel to the arm longitudinal axis, the first and second lateral legs each being disposed in an orientation that is generally transverse to the arm longitudinal axis, the first lateral leg being disposed closer to the actuator pivot bore than the second lateral leg, wherein the first and second longitudinal legs join the second lateral leg at a first interior bend location and at a second interior bend location within the closed coil periphery, respectively; and
a bobbin disposed within the closed coil periphery and contacting the conductive coil at only the first interior bend location and the second interior bend location, the bobbin defining a total bobbin length and an average bobbin with, and wherein the total bobbin length is at least 3 times the average bobbin width.

20. An actuator for a disk drive, the actuator comprising:
an actuator body;
a conductive coil attached to the actuator body, the conductive coil defining a closed coil periphery; and
a W-shaped bobbin disposed within the closed coil periphery and attached to the conductive coil, the W-shaped bobbin including a means for ensuring adequate frequency separation between an actuator system butterfly vibration mode and an actuator arm sway vibration mode.

21. A disk drive comprising:
a disk drive base;
a spindle rotably coupled to the disk drive base, and a disk attached to the spindle; and
an actuator, the actuator including:
an actuator body having an actuator pivot bore and an actuator arm extending away from the actuator pivot bore along an arm longitudinal axis;
a conductive coil attached to the actuator body, the conductive coil including first and second lateral legs joined by first and second longitudinal legs to form a closed coil periphery, the first longitudinal leg defining a longitudinal leg length measured generally parallel to the arm longitudinal axis, the first and second lateral legs each being disposed in an orientation that is generally transverse to the arm longitudinal axis, the first lateral leg being disposed closer to the actuator pivot bore than the second lateral leg; and
a W-shaped bobbin disposed within the closed coil periphery and contacting the conductive coil within the closed coil periphery at only a first location on the first longitudinal leg and a second location on the second longitudinal leg.

* * * * *